Jan. 11, 1955  W. A. E. JAKOBS ET AL  2,699,089
SYNCHRONIZED PROJECTING AND SOUND REPRODUCING APPARATUS
Filed April 10, 1952  4 Sheets-Sheet 1
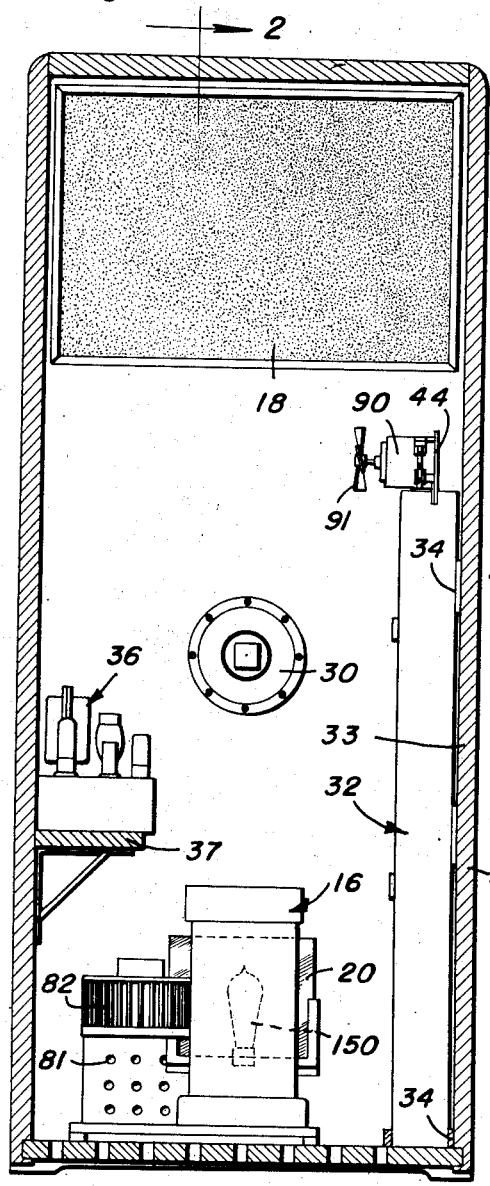
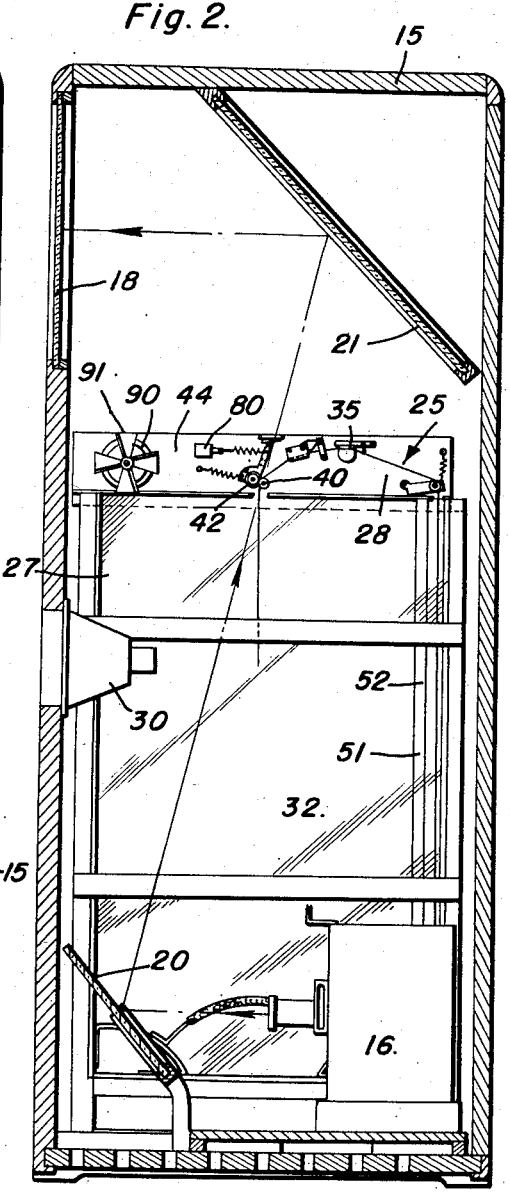
Walter A. E. Jakobs
Frank W. Emler
INVENTORS
BY *Clarence A. O'Brien*
and *Harvey B. Jacobson*
Attorneys

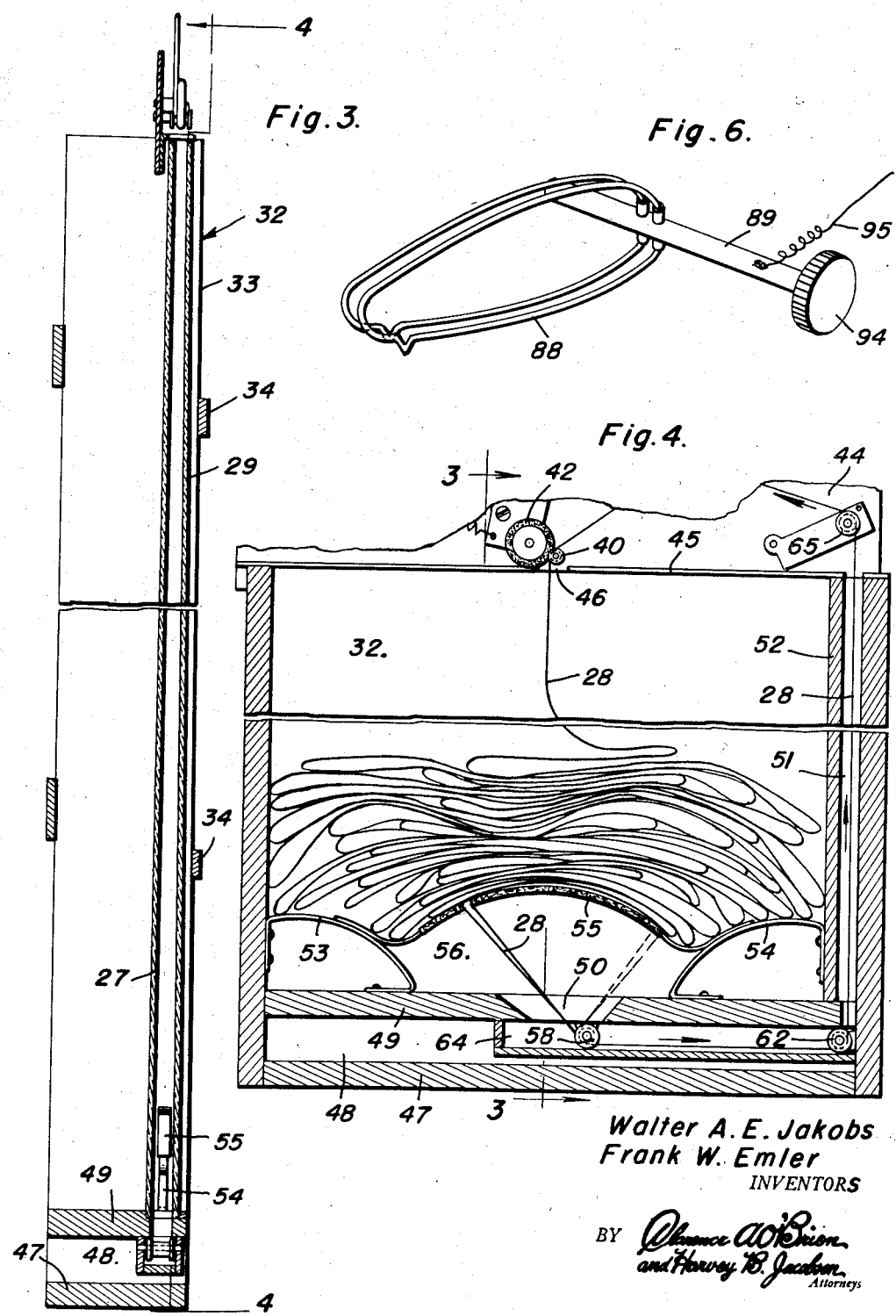

Jan. 11, 1955 W. A. E. JAKOBS ET AL 2,699,089
SYNCHRONIZED PROJECTING AND SOUND REPRODUCING APPARATUS
Filed April 10, 1952 4 Sheets-Sheet 3
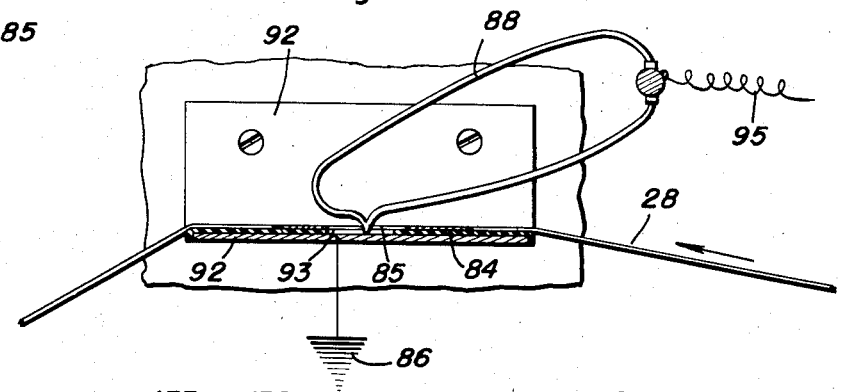
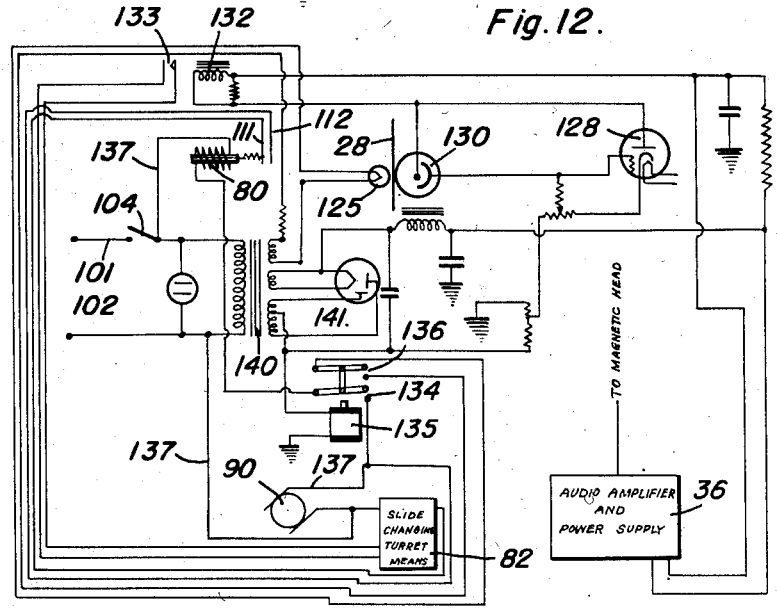
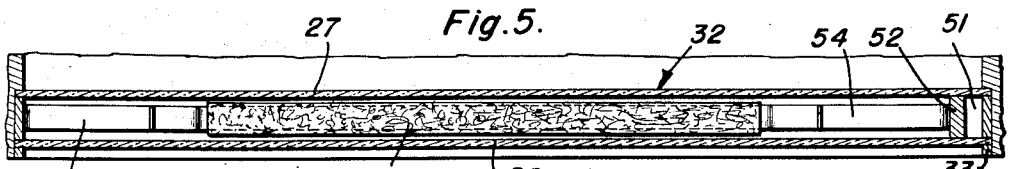
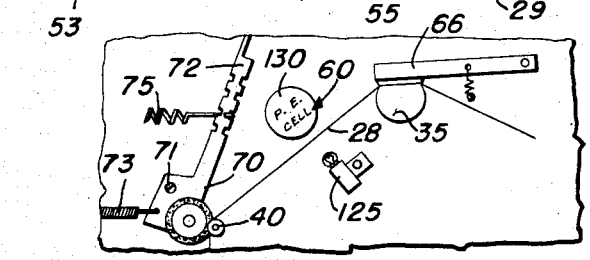
Walter A. E. Jakobs
Frank W. Emler
INVENTORS Jan. 11, 1955 W. A. E. JAKOBS ET AL 2,699,089
SYNCHRONIZED PROJECTING AND SOUND REPRODUCING APPARATUS
Filed April 10, 1952 4 Sheets-Sheet 4

Walter A. E. Jakobs
Frank W. Emler
INVENTORS

BY
Attorneys

United States Patent Office 2,699,089
Patented Jan. 11, 1955

2,699,089

SYNCHRONIZED PROJECTING AND SOUND REPRODUCING APPARATUS

Walter A. E. Jakobs, Burlingame, and Frank W. Emler, San Francisco, Calif.

Application April 10, 1952, Serial No. 281,504

10 Claims. (Cl. 88—28)

This invention relates to synchronized projection and sound reproducing apparatus and it has particular reference to continuously operating automatic projectors producing motion or still pictures accompanied by spoken words relating to the picture which is just showing or in which a talk such as an informative or explanatory lecture or discussion or sales talk is delivered into which the pictures are fitted.

Automatic apparatus of this type are mainly usable for educational or for advertising purposes in which case they usually provide visual and spoken information delivered in the manner and at the rate at which they have been recorded. Apparatus of this type normally do not admit a change or addition. Moreover, the number of pictures or the length of a film which can be shown is usually strictly limited, a certain period, such for instance as can be provided by a large phonograph disk, being the upper limit.

It is a main object of the invention to provide an apparatus which is so controllable in a simple and effective manner, not necessitating any special skill or training, that any number of additions to the talk, instruction or lecture may be made at any point, when desired by the operator, without disturbing the coordination between picture and talk, thus extending considerably the adaptability of the apparatus for two other purposes.

It is further a main object of the invention to provide an apparatus of this type in which the showing of pictures on slides or on films is not only perfectly synchronized with the accompanying informative talk by a simple means, but in which the synchronization remains perfect even if an interruption or addition to the recorded talk occurs.

It is a further main object of the invention to provide an apparatus eliminating completely the noisy and scratchy reproduction of the commonly used play back apparatus and to provide an apparatus which is portable to a certain extent or at least transportable and which is rugged, durable and foolproof, and which moreover can be controlled by means of a single operation performed with a single switching element in order to stop or to start it.

It is a further object of the invention to provide means whereby the length of the record can be considerably increased so as to last for a length of time which can be measured by the hour rather than by the minute, without in any way necessitating a compensation means for the speed, such as is necessary for all records using either a disk or a reel advancing a variable length of sound track during a given period at a constant speed.

A number of specific objects and of special features of the invention will be explained in the following detailed specification.

The invention is illustrated in the accompanying drawing showing two different modifications. It is however to be understood that these modifications are shown by way of example only and have been selected in order to explain the principle of the invention and the best modes of applying said principle. The drawing does not provide a survey of all those constructions with which the principle of the invention may be carried into effect and a departure from the example which has been illustrated is therefore not necessarily a departure from the essence of the invention.

In the drawing:

Figure 1 is an elevational sectional view through an apparatus in which the picture is projected on a transparent screen.

Figure 2 is a sectional elevational view of the apparatus the section being taken along line 2—2 of Figure 1.

Figure 3 is a sectional elevational view of the apparatus the section being taken along line 3—3 of Figure 4.

Figure 4 is an enlarged sectional and elevational view of the uppermost and lowermost part of the tank or magazine for the tape the section being taken along line 4—4 of Figure 3.

Figure 5 is a sectional plan view of part of the apparatus the section being taken along line 5—5 of Figure 3.

Figure 6 is a perspective view of a detail of the contact apparatus as used in connection with one of the modifications shown.

Figure 7 is a sectional elevational view of the same contact apparatus and of the adjacent parts.

Figure 8 is a view of the recording tape to be used within the apparatus.

Figure 11 is a partial view of the assembly of a modification of the sound reproducing unit, and Figure 12 is a diagram of the connections for this modification.

Figure 9:
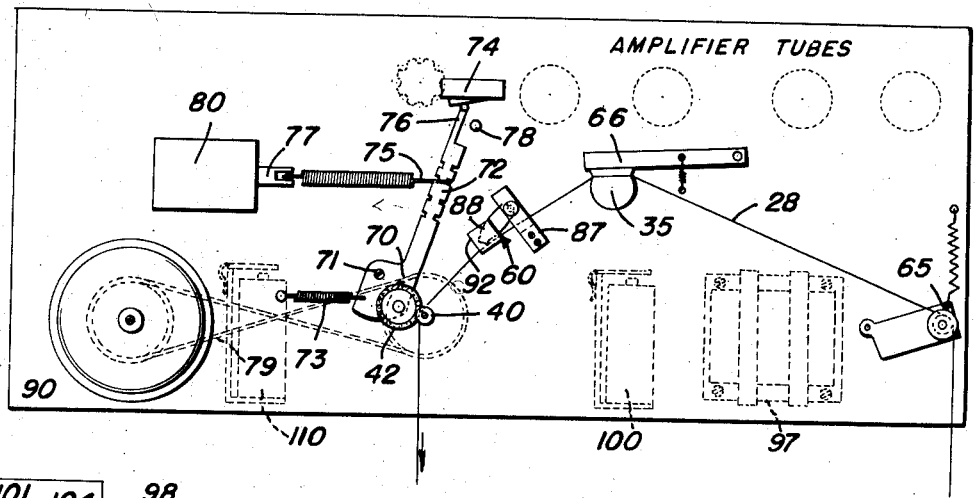
Figure 9 is a general view of the assembly of the sound reproducing unit.

The invention will be better understood when it is first explained that it is mainly concerned with the delivery of talks or lectures accompanied by pictures, usually slide pictures, and that this type of illustrated talks presents certain difficulties. One of the difficulties is connected with the synchronization between the projected pictures and the recorded speech or talk which is in many cases difficult to obtain and to maintain, as text fitting a single picture or a series of pictures devoted to a definite subject varies considerably in length so that no mechanical synchronization is possible. On the other hand it is also not possible to use synchronization means such as customary in connection with motion pictures, because this would entail a simultaneous recording of the picture and of the sound which usually is not feasible.

It is also desirable in connection with apparatus of this type to use the apparatus for the delivery of long talks, especially of talks exceeding the capacity of large disks, whether recorded on disks or on other recording means. If disks are used a change over mechanism must usually be provided and if a tape or film is used the reeling of long films or tapes also presents difficulties as either the speed of the delivery has changed during the unreeling or special and complex advance mechanisms become necessary. Further, the length of endless tapes or bands is rather limited and other mechanisms which work continuously must be reset.

As already above stated, the usefulness of the apparatus is greatly increased if it is possible to combine the recorded talk or lecture with explanatory or informative remarks or with additional talks given by the operator of the apparatus. To enable the operator or a third person to deliver such remarks the record must be cut out, but it is also necessary to hold the projected picture which is usually the subject of the remarks, allowing the change of the projected picture only after the operator has delivered his remarks. In such a case it is, of course, also necessary to maintain the original synchronization between pictures and sound record after such interruptions of the sound record, in order to be able to proceed with the recorded talk or lecture after the interruption.

The invention provides means for the above stated purposes and especially means permitting the interruption of the sound record in a very simple manner with a simple manipulation and these means also permit to hold the picture indefinitely for a selected period of time while maintaining full synchronization between picture projections and sound records. Further the invention provides means for storing records of considerable length exceeding the length usually recorded on disks or endless films or tapes.

The general arrangement of the projector according to the invention is best shown in Figures 1 and 2. The projector is housed in a relatively small casing 15 which, if not portable, is of such weight it can be moved from one place to another on wheels or rollers. At the bottom of the casing 15 a projector 16 is arranged. The bottom of the casing is preferably provided with slots for admitting air to the lamp housing of the projector and to other heated parts. A translucent screen 18 is arranged in the upper part of the casing 15 and the projection image is thrown on the said screen by means of two mirrors 20, 21 which are mounted within the casing at a suitable angle, the path of the central ray being indicated in Figure 2 by a line provided with arrows.

The projector 16 in the example shown is a slide projector for still pictures with an automatic slide changing mechanism, the slides and the mechanism being contained in the turret 82. The mechanism itself is not shown as any one of the well known slide changing mechanisms may be used which are operated by means of electric impulses tripping the slide changing mechanism. The casing 15 also contains a loudspeaker 30 and the sound reproducing unit which is generally indicated at 25 which comprises a magnetic recorder with a magnetic tape of the endless continuous type and which is provided with suitable mechanisms, described below, in order to produce an automatic cooperation between the recorder and the projector and especially a complete synchronization between the projection pictures and the record with the accompanying spoken text.

The sound reproducing unit which is generally indicated at 25 comprises the usual magnetic tape 28 and the usual magnetic head 35, the magnetic head being connected with a conventional amplifier unit 36 which may either be located on the template carrying the sound reproducing unit or which may be supported on a separate support 37 mounted within the casing. The amplifier unit 36 is of a conventional type and its power amplification stage is connected with the speaker 30. The necessary controls such as the volume and tone control of the sound, the control switches for various units etc. are not specifically shown as together with the above mentioned parts they form part of the conventional equipment of a sound reproducing unit.

According to the invention the magnetic tape 28 is housed and stored within a special tank or magazine 32 (Figures 1, 2, 3 and 4) which consists in a box or chest of such small width that it can just accommodate the width of the magnetic tape with only a small clearance. This box or chest however is of considerable height as it reaches upwardly from the bottom to a point which is not far below the screen 18 in the uppermost part of the casing 15. In this tank or magazine the front and back panels are preferably made of glass plates 27, 29 held within a suitable surrounding frame structure 33 which is fixedly held within the casing 15 by means of crossbars or ledges 34.

The two glass panels or plates 27, 29 which cover the front and the back of the tank are so mounted that they taper slightly towards the top, the magazine being thus slightly wider at the bottom so that the tape which is moving downwardly in the magazine or tank finds more and more clearance space, thus avoiding any jamming of the tape when moving through the magazine.

The magnetic tape 28 runs through this narrow tank or magazine 32 but on account of the width of the tank which is not much larger than the width of the tape, the layers of the tape which are formed as the tape is fed into the magazine are always spaced vertically as the tank does not permit the formation of layers at the same height. On the other hand on account of the considerable height of the tank or magazine a tape of very considerable length can be stored within the tank or magazine by depositing the tape simply in folded layers which are naturally and automatically formed by the own weight of the tape when the tape is fed into the tank or magazine 32. With this arrangement therefore no reel or auxiliary appliance is necessary on which the tape may be held.

The tape is delivered into the magazine and deposited therein by means of a tape driving capstan roller 40 (Figures 2 and 4) which cooperates with a rubber tired pressure wheel 42, described in detail below. The capstan roller and all other parts of the sound reproducing unit 25 are mounted on a mounting board or template 44 which is located at the top of the tank or magazine 32. The capstan roller 40 and the rubber tired pressure wheel 42 cooperating with it are so arranged on the lower side of the said template 44 that they are located directly above the ledge covering the entrance end of the tank, while the lower part of the template may reach down along the tank. The above mentioned ledge 45 is provided with a slot 46 through which the magnetic tape passes into the tank or magazine 32.

At the bottom of the tank 32 a compartment 48 is formed by means of a slotted board 49 and at one side of the tank 32 a channel like compartment 51 is formed by means of a partitioning ledge 52 which reaches from top to bottom of the tank.

The bottom board 49 of the tank is provided with an elongated slot 50 through which the tape is drawn when fed to the sound reproducing unit. To permit easy and regular withdrawal at the lower end without interference by the load put upon the lowermost folds of the tape by the layers above, the bottom board carries arc-shaped spring bands 53, 54 fixed on the side frame and on the bottom board 49 on both sides of the slot 50. These spring bands are so shaped and arranged that they narrow the bottom region of the tank. Resting on these two spring bands is a further felt covered arcuate band 55 which is bent upwardly and which thus keeps the space above the slot free so that the endless tape can be drawn into a free space 56 above the slot can move in this place. The tape may be drawn through the clearance space between the felt strip and a glass plate as, at the bottom of the tapering tank, the latter is sufficiently wide for this purpose and the tape thus can move freely within the free space 56 when unfolding the folded tape resting on the bands 53, 54, 55. Instead of the felt a strip of napped or pile fabric may be used which is glued to one glass wall, the tape being held by and drawn past the pile or nap of the fabric.

At the underside of the bottom board 49 a guide roller 58 is mounted beneath the slot 50, over which roller the tape runs and near the side wall of the tank another guide roller 62 is mounted which is aligned with the channel like compartment 51 through which the tape runs upwardly towards the sound reproducing unit 25 supported on the template 44.

Preferably, a special guide channel 64 is provided within the compartment 48 for the tape, the channel being formed by means of additional ledges or walls, which surround the tape narrowly in order to avoid the formation of folds should a slacking of the tape occur.

The template 44 which is mounted at the top of the tank 32 housing the tape carries practically all the mechanisms, relays and electronic tubes of the sound reproducing unit 25. This unit comprises an idling guide roller 65 which is mounted in a resilient way in alignment with the channel 51, the resilient mounting being provided in order to absorb all shocks which may be imparted to the tape when an occasional binding should occur as the tape unfolds. The roller thus keeps the tape stretched taut. Further, the said unit comprises a magnetic pick up head 35 which is of conventional design and construction and need therefore not be described. Part of this conventional construction is also the pressure lever 66. The said pressure lever, as well known, is under regulable spring pressure and forms the pressure regulator of the tape while the latter is running through the pick up head 35. From said pick up head the tape 28 runs through a synchronizing device 60, described below, to the capstan roller 40 which, together with the rubber tired pressure roller 42, forms the sole driving and advancing means for the tape.

The capstan roller 40 is permanently driven by means of a belt 79 by the electric motor 90 which is also mounted on the template 44 and said motor may also be provided with a fan 91 in order to circulate the air within the casing.

The normal weight of the tape puts just the proper amount of drag on it to pull out the folds and to draw the tape taut across the sound pick up head and the resistance of the tape thus produced is overcome by the pressure of the pressure roller 42 against the capstan roller 40. The pressure roller 42 is mounted on a swingable lever support 70 which may rock around an axle 71 and which is provided with a rock arm 72 having notches or holes which may be engaged by the end of a spring tensioned link 75 which is attached to the core 77 of a solenoid 80. When the solenoid is energized the arm 72 is therefore drawn towards it when the core 77 is moved into the interior of the solenoid and thereby the arm 72 and the member 70 are rocked, moving in a counterclockwise direction in Figures 9 and 11 as indicated by the arrow. The energization of the solenoid therefore moves the rubber tired roller 42 towards the capstan roller 40 and presses the former against the latter producing a firm grip on the tape which will draw said tape through the slot 50 through the channels 54 and 51 and through the magnetic head 35 thus unfolding the folded tape at the bottom of the tank while at the same time the tape is delivered through the slot 46 into the top part of the tank or magazine 32 where it will fold again. The tape thus forms an endless loop with a large number of folded layers in it stored within the tank, some of which are constantly straightened and unfolded and some of which are constantly formed by the weight of the tape and by the way it is fed into the tank, this process occurring only as long as the pressure roller 42 is applied against the capstan roller 40 under a sufficient pressure.

Should the solenoid be de-energized the arm 72 will no longer be drawn towards the solenoid and the pressure roller 42 will be drawn away from the capstan roller 40 by the spring 73 which counteracts the action of the solenoid 80. The de-energization of the solenoid 80 therefore instantly stops the advance of the tape 28 and no special braking mechanism is necessary to prevent the coasting of the tape after the withdrawal of the pressure roller, as the drag of the tape is at all times sufficient to overcome any advance of the tape which may be due to inertia.

The advance of the tape is thus controlled by the energization of the solenoid 80. The solenoid 80 together with spring 75, lever 72, and spring 73, moving the pressure roller 42 away from the capstan roller 40 thus forms a tape advance control device which can be disconnected as soon as the solenoid 80 is de-energized. The solenoid and the annexed part therefore form a disconnecting device for the tape advancing mechanism operated upon this energization for disconnection of the solenoid 80.

At its upper end the arm 72 is provided with a finger 76 which presses against the contact springs 111 and 112 of a switch 74, said finger closing the contact springs when the pressure roller 42 is applied against the capstan 40. The function of the switch is described below.

A stop 78 may be provided to avoid an angular movement of the rocking member 70 under the action of spring 73 which is larger than necessary to remove pressure from the tape and to open the switch.

The advance of the tape 28 is thus directly dependent on the energization of the solenoid 80. By cutting off the energizing circuit of the solenoid the advance of the tape is immediately stopped and this does not only cut out the sound reproduction but also stops the further operation of the slide changing mechanism, as will be explained below, so that the picture which is just projected is retained but is not changed until the solenoid is again energized. Moreover as the slide is merely held in its position full synchronism between the tape and the slide changing mechanism is not disturbed by the arresting of the tape in this manner.

Figure 10:
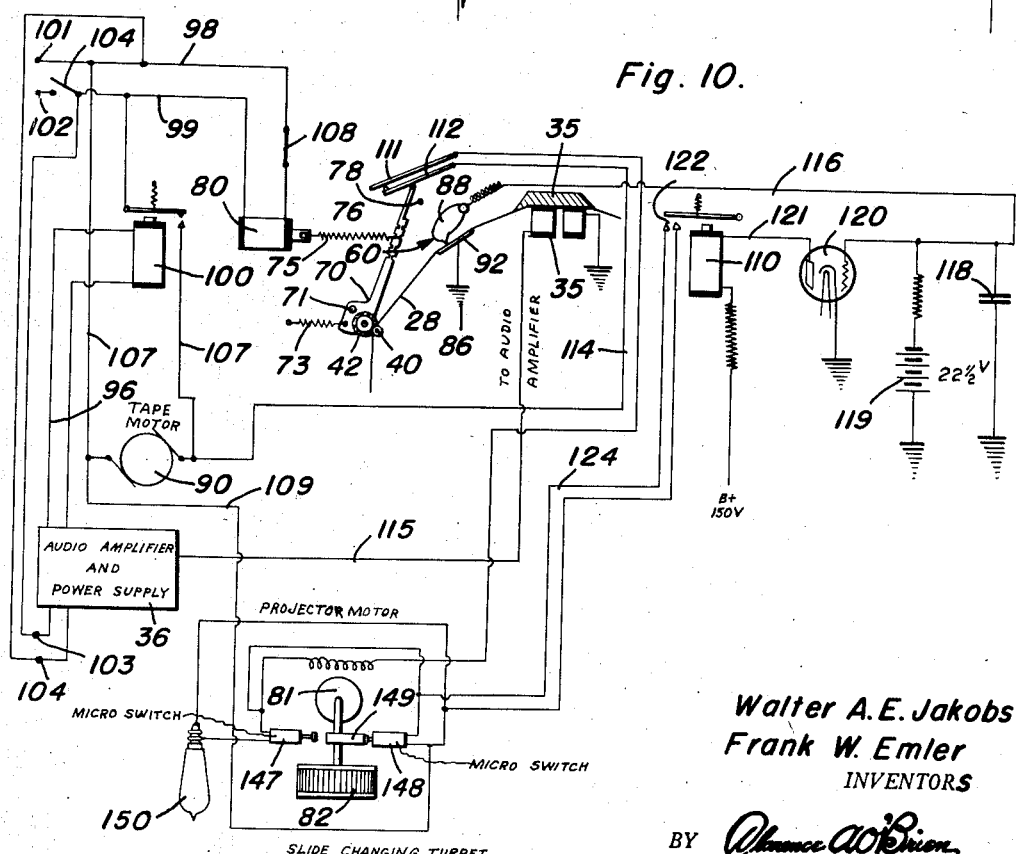
Figure 10 is a diagram of the connections of the sound reproducing unit.

The synchronization of the picture projector with the sound record is performed by a special synchronization device 60 operated by the magnetic record carrying tape, two modifications of which are shown in Figures 9 and 10 and in Figures 11 and 12, respectively. The slide changing device of the projector 16 is driven by a motor 81 (Figures 1, 10 and 12) which when operated cuts out the projector lamp, operates a turret slide magazine 82 and brings one of the slides into focus between the lamp and the projector lens while removing the slide which had been at this place before, and after a new slide has been made ready for projection turning on the projector lamp 150. In addition to the motor armature the mechanism comprises two micro switches 147, 148 cooperating with a cam 149 on the motor shaft which cam therefore controls the operation of the micro switches, which in their turn control the projection lamp 150 and the entire slide changing mechanism. The operation is initiated by a trip switch described below. This mechanism is well known in itself, it is a widely used commercial product and it is therefore not illustrated or described in detail.

The impulses which produce energizing of the slide changing mechanism of the projector are furnished in synchronization with the movement of the magnetic tape by means of slots 85 which have been cut into the magnetic tape at the place at which the sound record requires a new picture. These impulses are produced in the modification of the invention shown in Figures 11 and 12 by a photo-electric means and in the modification shown in Figures 9 and 10 by means of current impulses directly produced in an impulse circuit.

The tape 28 with its slots 85 when advanced by the capstan 50 and pressure roller 42 is drawn through the synchronization trough 92 (Figures 7 and 9) which, if a metallic sound tape (a tape with metallic coatings on both sides is used, is lined with an insulating material 84 which is provided with a slot 93, the trough being grounded at 86. The insulation can be omitted if the tape is insulating and is coated with metallic material on one side only. An insulating support 87 is fixed on the template 44 and carries a brush in the form of a cat whisker 88 preferably consisting of a plurality of somewhat resilient bronze elements, as seen in Figure 6, which are arranged in the line of advance of the slots in the tape 28 and which are resting on said tape while the latter is drawn through the trough 92. The brush 88 may be mounted on a shaft 89 rotatably held in support 87 which shaft is preferably provided with means for an electric connection with a wire 95. Obviously, the brush when under the influence of gravity (or if necessary under the additional influence of a small coil spring), as soon as the slot passes under its point is no longer supported by the tape and moves through the slots of the tape and through the slot in the insulated material and comes into contact with the synchronizing through 92 or a plate mounted thereon which is grounded and thereby the synchronizing impulse circuit is closed.

The connections for the synchronizing unit 25 are shown in Figure 10.

As seen the lines 98 and 99 which form the energizing circuit of the solenoid 80 are connected with terminals 101 and 102 which lead to a transformer 97 (not shown in Figure 10 but indicated in Figure 9) through which the network supplies the energizing circuit of the solenoid with current. One of these lines (99) contains the main operating switch 104 which is closed by the operator before the unit is started. This switch may also be used as the control switch, but for the sake of clearness a separate control switch 108, normally closed, is indicated in the figure.

The tape motor 90 is controlled by the relay 100 which is preferably energized through a circuit 96 which forms the plate circuit of one of the amplifier tubes of the amplifier set 36. The relay therefore will be operated when the amplifier operates. The emplacement of the relay on the template 44 is indicated in dotted lines in Figure 9.

The amplifier unit 36 will have its own power supply as indicated at 103 and 104 and may include a power pack or a rectifier. The amplifier which is of a conventional type need not be described in detail. It amplifies the voice currents which are induced in the magnetic head 35. Obviously, as long as relay 100 is energized it closes its contact and therefore keeps the tape motor 90 running. This motor, as already described, drives the capstan roller 40 which moves the tape provided that solenoid 80 is energized and the pressure roller 42 is applied against the tape under pressure.

It will be noted that the circuit 98 and 99 of the solenoid 80 also contains the slide holding switch 108 which has been mentioned above. This switch is operated by the operator as soon as it is necessary to cut out the advance of the tape and to hold the slide in order that the operator or a third person may insert his own explanations into those which are delivered by the recorded speech, lecture or talk. When the switch 108 is open the solenoid 80 is de-energized, the spring 73 draws the pressure roller 42 away from the capstan roller 40 and the further advance of the tape 28 ceases.

The projector motor 81 is controlled over the same lines 107 over which the tape motor is energized, but on one side this connection leads over the contacts springs 111 and 112 of the switch 74 which is controlled by the finger 76 of member 70. Therefore, as soon as the tape is arrested by the de-energization of the solenoid 80 the projector motor 81 is also arrested. This makes it impossible for a slide to change, even if the slide holding switch was pressed during the delivery of a slide changing impulse. The projector is therefore immediately arrested in the position in which it is in as soon as switch 108 is open. The projector lamp however continues to function as this lamp is only turned off by the switch when the slide changing occurs.

The impulses for initiating the slide changing cycle are given by the brush 88 when this brush completes the circuit to the ground at 86 over the line 116 which is connected with a grid of an electronic tube 120 controlling the relay 110. The grid of the electronic tube is biased by a special grid bias battery 119 for cut-off, so that no plate current can flow in the tube and through the line 121 connected with the relay 110. However, when the circuit 116 is grounded by the brush 88 the negative cut-off bias is removed from the grid by the by-pass to the ground which has been established, and current can flow through the tube 120 and a current impulse is therefore produced energizing relay 110. The relay closed the contacts 122 sending an impulse over lines 124 to the slide changing mechanism which impulse initiates the slide changing cycle. The contacts 122 therefore are the substitute for the customary trip switch of the slide changing mechanism.

As the impulse sent through the relay may be too short to operate the slide changing mechanisms a time delay unit is connected with the electronic tube 120 which preferably consists in a suitably dimensioned condenser 118 which is inserted in parallel to the grid biasing battery. This condenser is initially charged by the battery and helps in keeping the grid at the cut-off voltage. However, when the circuit 116 is grounded the condenser is discharged and when the circuit 116 is again interrupted the battery must recharge the condenser. As the charging of the condenser takes some time a current will flow through the tube 120 and energize relay 110 until the condenser is again charged. The impulse has therefore a definite length which is determined by the charging time of condenser 118.

In the modification of the synchronization device illustrated in Figures 11 and 12 a photo-electric control takes the place of the grid circuit control of an electronic tube to produce the impulses operating the slide changing mechanism of the projector. As seen in Figure 11 which illustrates the modification of the sound recording and reproducing unit an exciter lamp 125 and a photo-electric cell 130 are arranged on opposite sides of the tape 28, the arrangement being such that the rays exciting the cell are so concentrated that they fall on the region of the tape which is in the path of the advancing slots 85. As soon as a slot passes between the lamp and the cell the cell therefore receives an impulse which is transmitted to the grid of amplifier tube 128 and may be so amplified in the tube that the relay 132 is energized. The energization of the relay 132 closes the contacts 133 sending an impulse to the slide changing mechanism in turret 82.

In all other respects the connections shown in Figure 12 are very similar to those already explained.

The electric motor 90 is in this case energized over a circuit 137 which is directly connected with the supply lines 101, 102 controlled by a single switch 104 which acts as the main switch and as a control switch. The circuit 137 is controlled by the contacts 134 of relay 135. This relay is always energized when the transformer 140 of the power unit 141 of conventional design is energized. The circuit 137 in this case also contains the solenoid 80, so that the switch 104 when opened, not only stops the tape but also stops the driving of the capstan roller driven by motor 90. The springs 111 and 112 of the switch 74 are shown as being directly controlled by the solenoid 80. They control the motor 81 of the projector as has been explained in connection with the diagram shown in Figure 10. The other connections are the same as already explained.

The cycle of operations for the apparatus shown in Figures 9 and 10 is the following.

The closing of switch 104 energizes the power transformer and the solenoid 80 over lines 98 and 99 forcing the rubber tired pressure wheel 42 against the capstan roller 40. Simultaneously with the power transformer the power pack for the audio amplifier is energized, the amplifier tubes warm up and as soon as warmed the relay 100 is operated closing circuit 107, which energizes motor 90. The capstan roller is now driven and the magnetic tape is drawn through the magnetic head, is withdrawn from the lower end of the tank or magazine and is fed to the upper portion of the tank and deposited in folded loops at the entrance end while the folded layers are straightened and drawn out at the bottom. The speech or music recorded on the tape is now reproduced in the speaker. The completion of circuit 107 of the motor also completes the circuit 109 of the projector motor 81, the branch 114 of which is under control of contacts 111, 112 of switch 74 which has been closed by the finger 76 upon energization of solenoid 80.

The impulse circuit tripping the slide mechanism is however open until a slot 85 of the tape passes through trough 92. The grounding of the brush or cat whiskers 88 sends an impulse to relay 110 the duration of which, whatever the duration of the contact of the brush 88 with the grounded member 92, is of a definite duration determined by the charging time of condenser 118. The impulse trips the slide changer and the picture of a new slide is projected as soon as the explanation of this slide starts. At any time by opening switch 108 the operator may hold the tape and the slide in its position as the de-energization of solenoid 80 releases the pressure roller and the opening of switch 74 with its contacts 111, 112 stops the projector motor 81 thus preventing a change of the slide even if an impulse is in the process of being sent.

It will be clear that minor changes and changes of the unessential elements will not in any way form a departure from the essence of the invention as defined in the annexed claims.

Having described the invention, what is claimed as new is:

1. In an apparatus for substantially automatic synchronized picture projection and sound reproduction, provided with a slide projector, a slide changing mechanism, and a magnetic sound reproducing means, the latter including an amplifier, a source of current, an endless magnetic record carrying tape, and a tape advancing means, means for driving said tape advancing means, including an electric motor, continuously operated when the amplifier of the sound reproducing apparatus is supplied with current in order to maintain the automatic operation, a disconnecting device for the tape advancing means, including electromagnetic means, the energization of which controls said disconnecting device, a synchronization impulse producing assembly, connected with and operated by the magnetic record carrying tape, the latter being provided with synchronizing perforations at predetermined places, and said synchronization impulse producing assembly further including contact means arranged on both sides of the magnetic record carrying tape, which come into contact with each other through the said synchronizing perforations, an impulse circuit controlled by said contacts, said impulse circuit controlling the slide changing mechanism and manually controlled means for controlling separately the electromagnetic means of the disconnecting device, arresting the tape advance and thereby indirectly also stopping further operation of the slide changing mechanism of the projector, maintaining the projection of the picture in the projector for the time being and holding the apparatus in a state of readiness while suspending the automatic operation.

2. In an apparatus for substantially automatic synchronized picture projection and sound reproduction, provided with a slide projector having a slide magazine and an impulse controlled slide changing mechanism, and further having an endless magnetic sound record carrying tape, drawn through a tape tank, holding said magnetic sound record carrying tape in folded condition, said tank being formed by two substantially vertical panels spaced so as not substantially to exceed the width of the tape, and so arranged that the panels taper from the bottom towards the top, the tank having an upper entrance end for the tape at the top and an exit end for the tape withdrawn from the tank at the bottom, the magnetic tape during its passage forming folded layers in said tank, piled one upon the other under their own weight, the bottom of the tank being provided with an elongated slot, upwardly extending arcuate supporting bands laterally arranged on both sides and above the slot, and a further felt covered, upwardly extending curved band arranged above the elongated slot between the two laterally arranged arcuate bands and of a smaller width than the width of the tank, said bands supporting the tape folded under its own weight and maintaining a free space above the slot, whereby the tape is drawn through the slot, unfolding the loops supported by the arcuate bands in a regular manner and without tangling.

3. A substantially automatic apparatus for synchronized picture projection and sound reproduction, provided with a projector having automatically operated picture changing means and with a magnetic sound reproducing means, the latter including an endless magnetic sound record carrying tape, a tape tank holding said magnetic tape in folded condition, and a single tape advancing means located near the entrance of the tank and including a capstan roller, comprising means for driving the said capstan roller, including an electric motor and an energizing circuit for the same, a pressure roller with a resilient surface, means for applying the resilient surface of the pressure roller normally against the capstan roller with a pressure sufficient to produce a gripping of the magnetic record carrying tape, disconnecting means controlling the application of such pressure to said pressure roller, said disconnecting means being controlled by an electromagnetic device, removing the gripping pressure between the pressure roller and capstan roller when operated, an automatic synchronization impulse producing device, controlled by perforations in the magnetic record carrying tape, said synchronization impulse producing, tape controlled device having a circuit with circuit control means located on both sides of the tape at a point near the tape advancing means and being controlled by the perforations of the tape means controlled by said impulses for producing a change of the projected pictures upon passage of a tape perforation at the above mentioned point, means for amplifying and reproducing the sound currents induced by the magnetic tape, including current supplying means, said amplifying and sound current reproducing means, when operated, normally also supplying the electromagnetic device of the disconnecting means of the tape advancing means with current, thus keeping the tape advancing and separate manually controlled means for controlling the disconnecting means which, when operated, arrest the tape advance and thereby the delivery of impulses to the automatic picture changing means and the sound reproducing operation without influencing the picture projection.

4. An apparatus for substantially automatic synchronized picture projection and sound reproduction, provided with a projector having a projector lamp, a slide changing device controlling the projector lamp and a magnetic sound reproducing means, the latter including an endless magnetic tape provided with means for controlling the slide changing device of the projector, a tape tank holding said magnetic tape in folded condition, a single tape advancing means located near the entrance end of the tank for feeding said tape into and withdrawing it from the said tank, the tape advancing means including a capstan roller, comprising means for driving the said capstan roller continuously including an electric motor and an energizing circuit for the same, a pressure roller with a resilient surface, means for applying said pressure roller with the resilient surface against the capstan roller with substantial pressure to produce a gripping of the magnetic tape, means for controlling the application of pressure to said pressure roller, adapted to relieve said gripping pressure, said means including a spring tensioned rockable arm carrying the pressure roller, said spring drawing the pressure roller away from said capstan roller, a solenoid having a core linked to said rocking arm, said solenoid when energized rocking said arm and applying the pressure roller against the capstan roller under pressure, an energizing circuit for the solenoid, a normally closed manually controlled stop switch for interrupting the energizing circuit of the solenoid, said switch when open stopping the advance of the magnetic tape, by withdrawal of the pressure roller from the capstan roller, thus arresting the automatic synchronized operation of the slide projector, but maintaining the picture projection without disturbing the synchronization between the tape and the tape operated slide changing device.

5. An apparatus as claimed in claim 4, wherein the synchronization impulse producing device includes a conducting synchronization member arranged on one side of the magnetic tape, a movable brush member resting on the magnetic tape in the path of the slots provided in the magnetic tape and an impulse circuit connected with both the conducting member and the brush.

6. An apparatus as claimed in claim 4 wherein the impulse for the slide changing mechanism is produced by a relay, the energizing circuit of which is formed by the impulse circuit, said impulse circuit containing between the brush sliding on the tape and the relay an electronic tube, controlled by the impulses and having a time delay device for delivering impulses of equal duration sufficient to allow the projector to complete its cycle.

7. An apparatus as claimed in claim 4 wherein the two members acting upon each other and placed on both sides of the tape consist of an exciter lamp and a photoelectric cell, so arranged that the tape prevents exciting of the cell, when imperforate but passes the rays of the exciter lamp through the perforations of the tape, the impulse circuit being connected with the photo-electric cell.

8. An apparatus as claimed in claim 3, wherein the pressure roller of the tape advancing means is mounted on a spring tensioned rockable arm, said spring drawing the pressure roller away from said capstan roller, and wherein the electromagnetic control device of the disconnecting means consists of a solenoid having a core linked to said rocking arm, said solenoid, when energized, rocking said arm and applying the pressure roller against the capstan roller under pressure, said apparatus further comprising an energizing circuit for said solenoid controlled by the manually controlled means for the disconnecting means, a finger on said rockable arm, a switch on said finger closed when the pressure roller is moved towards the capstan roller, an electric motor for driving the automatically operated picture changing means on said projector, said last named electric motor having an energizing circuit partly in common with the electric motor driving the capstan roller, but having a branch controlled by the aforesaid manually controlled means of the disconnecting means to arrest operation of the picture changing means of the projector when the advance of the tape is stopped by the withdrawal of the pressure roller from the capstan roller.

9. An apparatus as claimed in claim 5 wherein the conducting synchronization member consists of a U-shaped trough open at its sides, the bottom of which is aligned with and supports the magnetic tape at the point where the brush member rests on the tape.

10. An apparatus as claimed in claim 4 wherein the manually controlled stop switch simultaneously with the closing of the energizing circuit of the solenoid also closes the energizing circuit of a relay connected with a power pack, said relay controlling the tape advance motor.

References Cited in the file of this patent

UNITED STATES PATENTS

| Number | Name | Date |
|---|---|---|
| 1,213,150 | Bullis | Jan. 23, 1917 |
| 1,612,359 | Chipman | Dec. 28, 1926 |
| 1,732,636 | Gautier et al. | Oct. 22, 1929 |
| 1,832,097 | Chipman | Nov. 17, 1931 |
| 1,909,765 | Jenkins et al. | May 16, 1933 |
| 1,998,889 | Weir | Apr. 23, 1935 |
| 2,002,352 | Owens | May 21, 1935 |
| 2,038,976 | Wood et al. | Apr. 28, 1936 |
| 2,096,020 | Adair et al. | Oct. 19, 1937 |
| 2,109,627 | Finch | Mar. 1, 1938 |
| 2,116,314 | Jenkins | May 3, 1938 |
| 2,136,209 | Finch | Nov. 8, 1938 |
| 2,346,194 | Sjostrom | Apr. 11, 1944 |
| 2,542,506 | Gibson | Feb. 20, 1951 |